US012725322B2

(12) United States Patent
Shigemitsu et al.

(10) Patent No.: US 12,725,322 B2
(45) Date of Patent: Sep. 1, 2026

(54) NON-TRANSITORY COMPUTER-READABLE STORAGE MEDIUM STORING PROGRAM, MIRRORING METHOD, AND ELECTRONIC EQUIPMENT

(71) Applicant: SEIKO EPSON CORPORATION, Tokyo (JP)

(72) Inventors: Makoto Shigemitsu, Sapporo (JP); Shota Utsumi, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 208 days.

(21) Appl. No.: 18/621,278

(22) Filed: Mar. 29, 2024

(65) Prior Publication Data

US 2024/0331219 A1 Oct. 3, 2024

(30) Foreign Application Priority Data

Mar. 30, 2023 (JP) ................................ 2023-054904

(51) Int. Cl.
*G06T 11/10* (2026.01)
*G06F 3/14* (2006.01)

(52) U.S. Cl.
CPC ............ *G06T 11/10* (2026.01); *G06F 3/1454* (2013.01)

(58) Field of Classification Search
CPC ........ G06T 11/001; G06T 11/20; G06T 11/40; G06T 11/60; G06T 11/08; G06T 3/08; G06T 3/10; G06T 3/14; G06T 3/20; G06F 3/048; G06F 3/1415; G06F 3/1454; G06F 3/0481; G06F 3/0484; G06F 3/0487; H04N 21/4126; H04N 21/4122; H04N 21/43637; H04N 21/43076; H04N 21/41047
See application file for complete search history.

(56) References Cited

U.S. PATENT DOCUMENTS

| | | | | |
|---|---|---|---|---|
| 11,429,339 | B2 * | 8/2022 | Choi | H04N 21/4126 |
| 2009/0146991 | A1 * | 6/2009 | Shimodaira | G06F 3/041 345/214 |
| 2014/0002389 | A1 * | 1/2014 | Kim | H04N 21/43615 345/1.3 |
| 2015/0058900 | A1 | 2/2015 | Nakagawa | |
| 2017/0053427 | A1 * | 2/2017 | Oikawa | H04N 7/15 |
| 2017/0153865 | A1 * | 6/2017 | Tsubone | G06F 3/1454 |
| 2020/0082795 | A1 * | 3/2020 | Ano | G09G 3/001 |
| 2023/0168854 | A1 * | 6/2023 | Kim | G06F 1/1694 345/2.2 |

FOREIGN PATENT DOCUMENTS

JP 2015-041822 A 3/2015

* cited by examiner

*Primary Examiner* — Wesner Sajous
(74) *Attorney, Agent, or Firm* — Oliff PLC

(57) ABSTRACT

Electronic equipment includes a display device and a processing device. The processing device captures a target image including a content image displayed, according to a program executed in an application execution environment, on a first layer of an image displayed on the display device. The processing device transmits a capture image acquired by the capturing to an external device to thereby perform mirroring. The processing device repeatedly draws, on the first layer, a second image different from the content image in a period in which the mirroring is executed.

6 Claims, 5 Drawing Sheets

FIG. 9

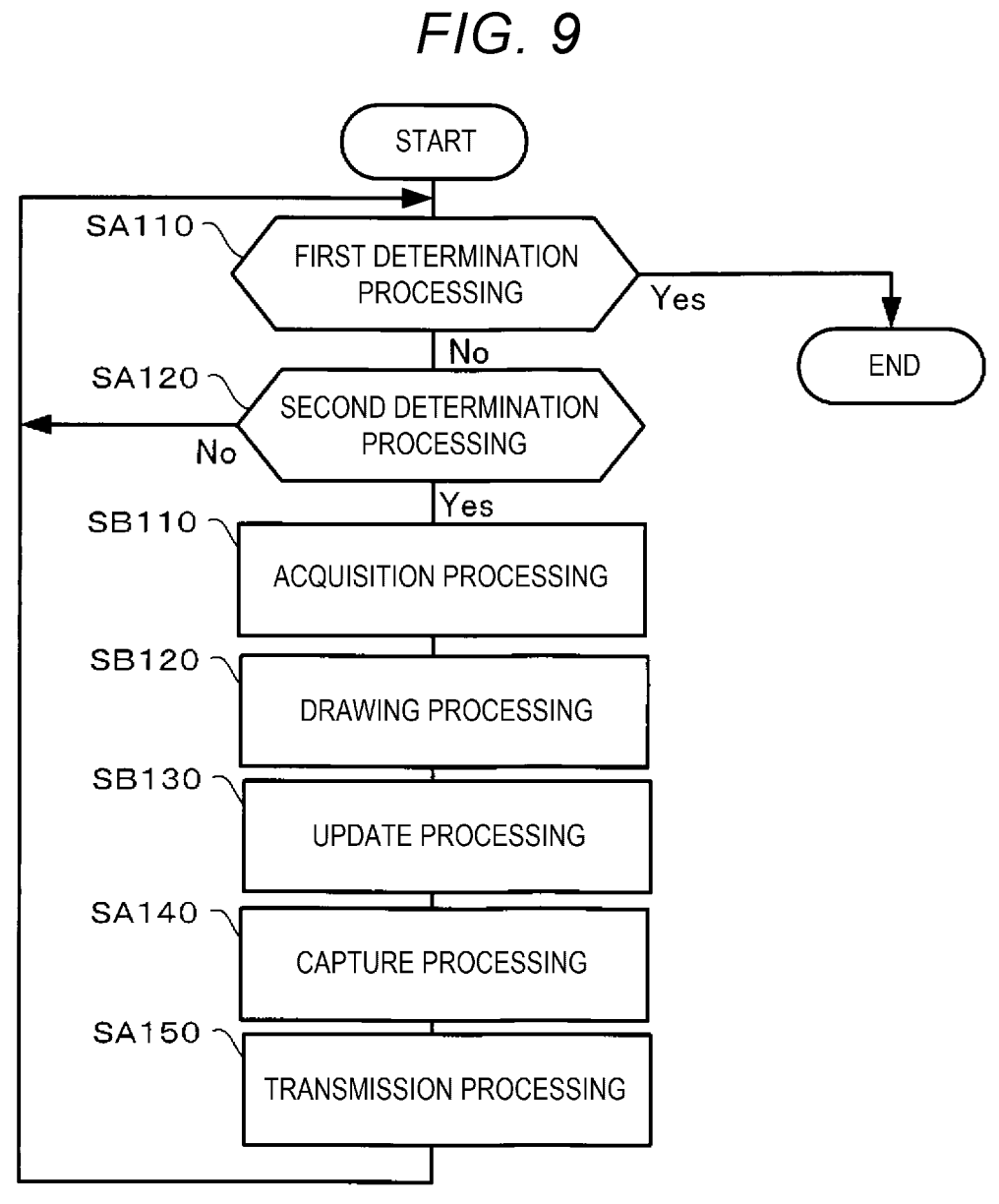

START
SA110 FIRST DETERMINATION PROCESSING
Yes
END
No
SA120 SECOND DETERMINATION PROCESSING
No
Yes
SB110 ACQUISITION PROCESSING
SB120 DRAWING PROCESSING
SB130 UPDATE PROCESSING
SA140 CAPTURE PROCESSING
SA150 TRANSMISSION PROCESSING

NON-TRANSITORY COMPUTER-READABLE STORAGE MEDIUM STORING PROGRAM, MIRRORING METHOD, AND ELECTRONIC EQUIPMENT

The present application is based on, and claims priority from JP Application Serial Number 2023-054904, filed Mar. 30, 2023, the disclosure of which is hereby incorporated by reference herein in its entirety.

BACKGROUND

1. Technical Field

The present disclosure relates to a non-transitory computer-readable storage medium storing a program, a mirroring method, and electronic equipment.

2. Related Art

JP-A-2015-041822 (Patent Literature 1) discloses an image communication device including capture means for capturing an image displayed on display means to thereby generate a capture image and mode control means for switching a mode of a video to be transmitted to another device. Modes in Patent Literature 1 include a mirroring mode for transmitting the capture image to the other device.

Patent Literature 1 does not describe in detail when a mirroring target image is captured in the mirroring mode. In the following explanation, the mirroring target image is referred to as target image. Various forms are conceivable about when the target image is captured. As an example, a form of capturing the target image at the opportunity when the target image has been updated.

In recent years, various application execution environments for enabling an application program developed for a certain OS (Operating System) to be executed in other OSs have been proposed. When a content image displayed according to the application program executed in the application execution environments is included in a target image, a deficiency sometimes occurs in mirroring depending on an application execution environment. For example, in the case of an application execution environment in which a content image is not captured unless the content image is updated, a problem occurs in mirroring of an entire target image.

SUMMARY

According to an aspect of the present disclosure, there is provided a non-transitory computer-readable storage medium storing a program, the program causing a processing device in electronic equipment, which includes a display device and the processing device that displays an image on the display device, to execute: capturing a first image including a content image drawn, according to an application program executed in an application execution environment, on a first layer in the image displayed on the display device; transmitting a capture image acquired by the capturing to an external device; and repeatedly drawing, on the first layer, a second image different from the content image in a period in which the transmitting is executed.

According to an aspect of the present disclosure, there is provided a mirroring method for an image displayed on a display device in electronic equipment including the display device and a processing device that displays the image on the display device, the mirroring method including: capturing a first image including a content image drawn, according to an application program executed in an application execution environment, on a first layer in the image displayed on the display device; transmitting a capture image acquired by the capturing to an external device; and repeatedly drawing, on the first layer, a second image different from the content image in a period in which the transmitting is executed.

According to an aspect of the present disclosure, there is provided an electronic equipment including: a display device; and a processing device that displays an image on the display device, the processing device executing: capturing a first image including a content image drawn, according to an application program executed in an application execution environment, on a first layer in the image displayed on the display device; transmitting a capture image acquired by the capturing to an external device; and repeatedly drawing, on the first layer, a second image different from the content image in a period in which the transmitting is executed.

BRIEF DESCRIPTION OF THE DRAWINGS

FIG. 9 is a flowchart showing a flow of processing in a mirroring method executed by a processing device of the electronic equipment according to a program.

DESCRIPTION OF EMBODIMENTS

Figure 1:
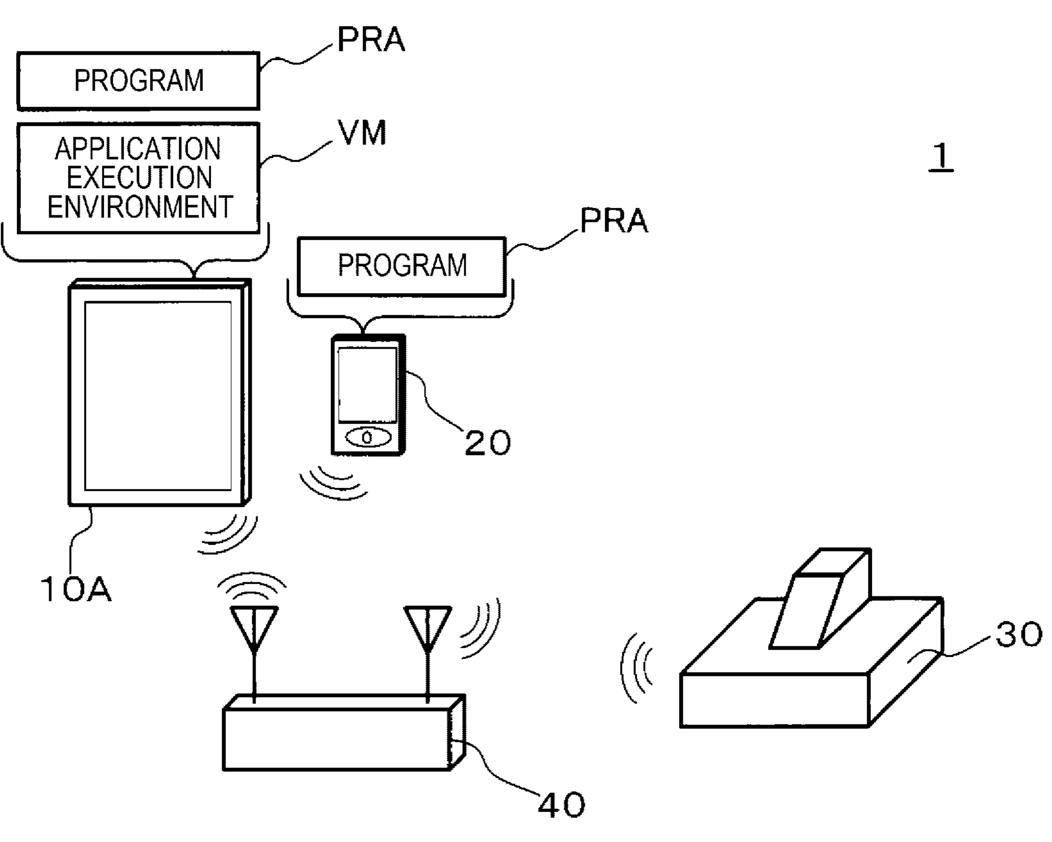
FIG. 1 is a diagram showing a configuration example of a display system including electronic equipment according to a first embodiment of the present disclosure.

Electronic equipment according to an embodiment of the present disclosure is explained below with reference to the drawings. Note that, in the drawings, dimensions and scales of units are differentiated from actual ones as appropriate. Since embodiments explained below are suitable specific examples, technically preferable various limitations are added to the embodiments. However, the scope of the present disclosure is not limited to the embodiments unless, in the following explanation, there is particular description to the effect that the present disclosure is limited.

A: First Embodiment

FIG. 1 is a diagram showing a configuration example of a display system 1 including electronic equipment 10A according to a first embodiment of the present disclosure. As shown in FIG. 1, the display system 1 includes, besides the electronic equipment 10A, electronic equipment 20, a projector 30, and a wireless relay device 40. The wireless relay device 40 is, for example, an access point device of a wireless LAN (Local Area Network). The wireless relay device 40 relays wireless communication among the electronic equipment 10A, the electronic equipment 20, and the projector 30. In the display system 1, the electronic equipment 10A communicates with the projector 30 via the wireless relay device 40. In the display system 1, the electronic equipment 20 communicates with the projector 30 via the wireless relay device 40. In the display system 1, the projector 30 displays an image by projecting, onto a projection surface such as a projection screen, an image represented by image data transmitted from the electronic equipment 10A or the electronic equipment 20. The display system 1 shown in FIG. 1 includes one projector 30. However, the display system 1 may include a plurality of projectors 30. The projector 30 is an example of the external device in the present disclosure.

The electronic equipment 10A and the electronic equipment 20 are information processing devices having a program executing function. In this embodiment, the electronic equipment 10A is a tablet terminal and the electronic equipment 20 is a smartphone. In each of the electronic equipment 10A and the electronic equipment 20, a program PRA for capturing an image being displayed on the electronic equipment and transmitting image data representing the captured image to the projector 30 is stored. In the display system 1, the electronic equipment 10A executes the program PRA to thereby realize causing the projector 30 to project an image being displayed on the electronic equipment 10A, that is, mirroring of a display image of the electronic equipment 10A. Similarly, in the display system 1, the electronic equipment 20 executes the program PRA to thereby realize mirroring of an image being displayed on the electronic equipment 20.

The program PRA in this embodiment is a program developed for an OS of the electronic equipment 20. In this embodiment, an OS of the electronic equipment 10A is different from the OS of the electronic equipment 20. Therefore, the program PRA cannot be directly executed on the OS of the electronic equipment 10A. In this embodiment, a developer of the OS of the electronic equipment 10A provides an application execution environment VM for enabling the program for the OS of the electronic equipment 20 to be executed on the OS of the electronic equipment 10A. The electronic equipment 10A has the application execution environment VM. The electronic equipment 10A executes the program PRA using the application execution environment VM.

In the electronic equipment 10A, besides the program PRA and the application execution environment VM, various application programs such as document preparation software and spreadsheet software are installed in advance. The various application programs installed in the electronic equipment 10A are classified into native applications developed for the OS of the electronic equipment 10A and nonnative applications developed for other OSs. The program PRA explained above is an example of the nonnative applications.

Figure 2:
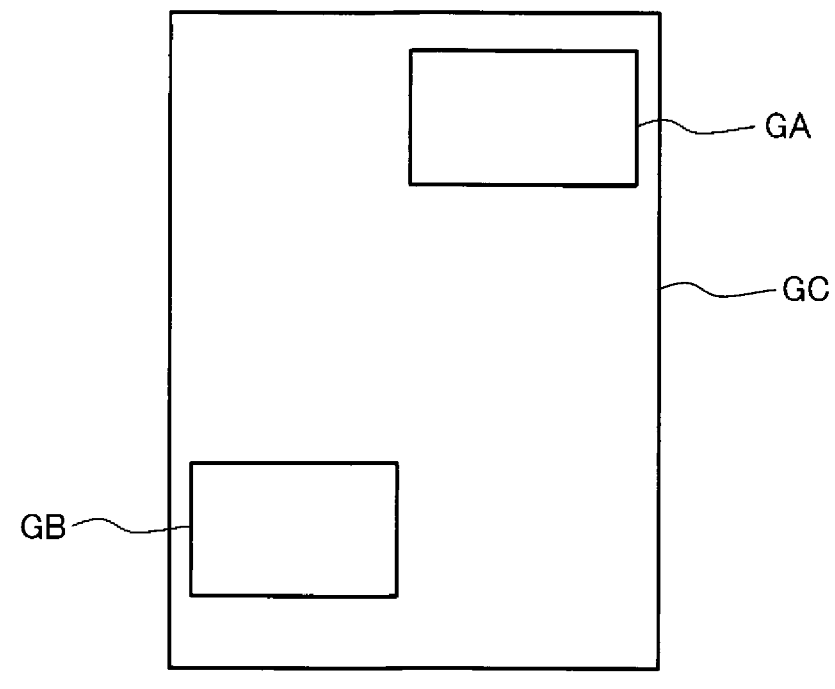
FIG. 2 is a diagram showing an example of an image displayed on the electronic equipment.

The electronic equipment 10A can execute a native application in parallel to the execution of the program PRA on the application execution environment VM. The electronic equipment 10A executing the native application in parallel to the execution of the program PRA on the application execution environment VM displays an image GC including an image GA displayed according to the program PRA and an image GB displayed according to the native application. FIG. 2 is a diagram showing an example of an image displayed on the electronic equipment 10A. The image GA is, for example, an image of a menu screen for causing a user to perform various kinds of operation for mirroring. The image GB is, for example, an image of a document prepared according to the document preparation software. Conceptually, the image GC is divided into a layer L2 on which the image GB is arranged and a layer L1 superimposed on the layer L2, the image GA being arranged on the layer L1. An image of a nonnative application is displayed on the layer L1. In the following explanation, the layer L1 is referred to as nonnative layer. The nonnative layer is an example of the first layer in the present disclosure. An image of a native application is displayed on the layer L2. In the following explanation, the layer L2 is referred to as native layer.

Figure 3:
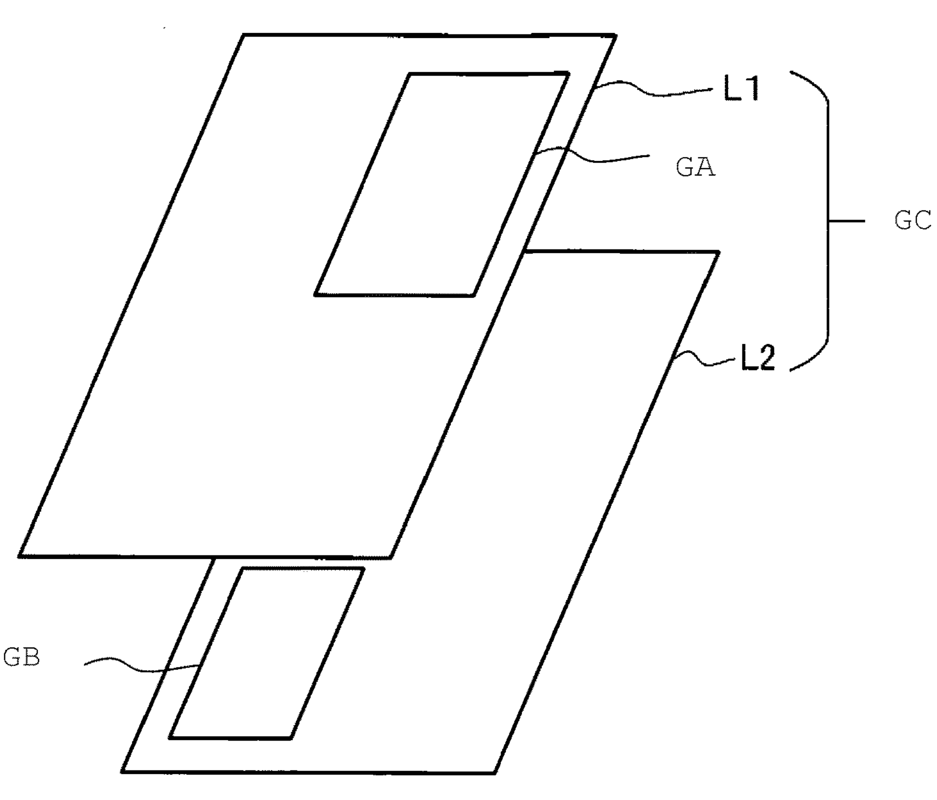
FIG. 3 is a diagram for explaining layers in the image displayed on the electronic equipment.

FIG. 3 is a diagram for explaining layers in an image displayed on the electronic equipment 10A. When the image GC shown in FIG. 3 is a target of mirroring, depending on specifications of the application execution environment VM, in some case, update of a native layer is not detected and a problem occurs in the mirroring. The same deficiency is sometimes caused by a bug of the application execution environment VM. The program PRA in this embodiment is configured to be able to avoid such a deficiency. A characteristic of this application is represented by this point. The electronic equipment 10A having the program PRA and the application execution environment VM is mainly explained below.

Figure 4:
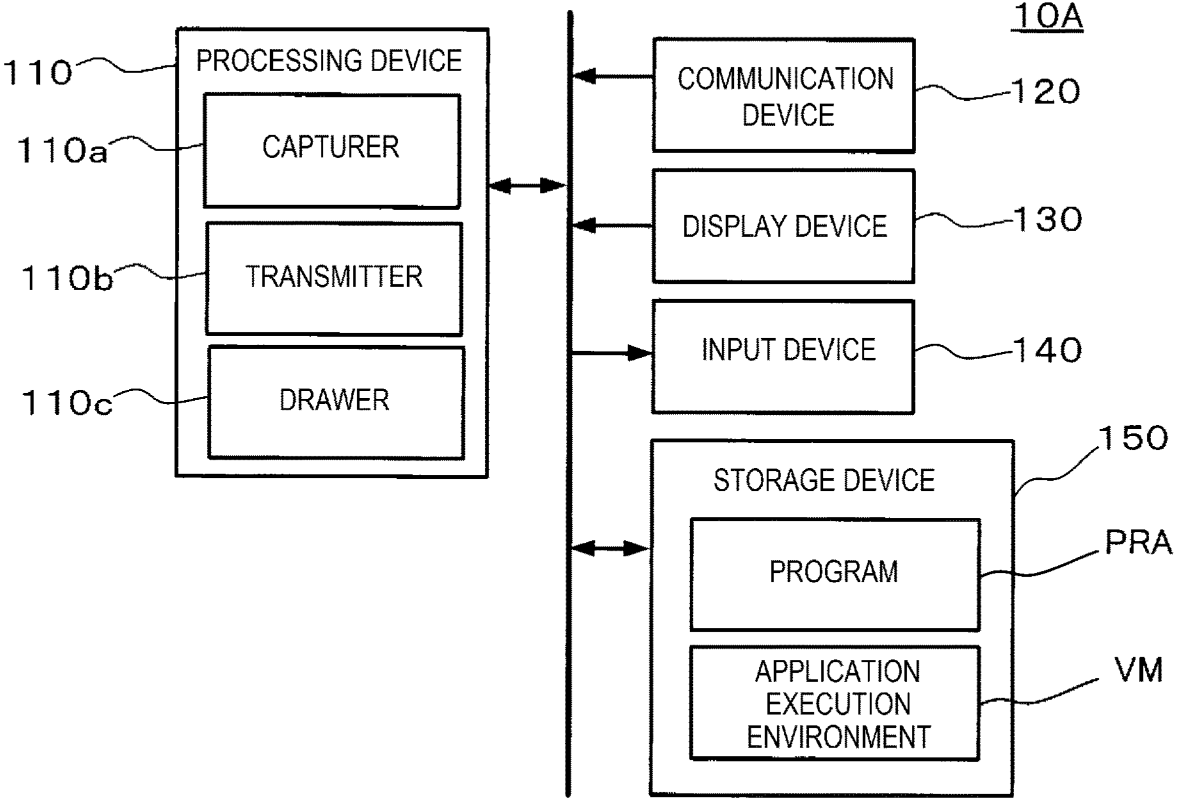
FIG. 4 is a diagram showing a configuration example of the electronic equipment.

FIG. 4 is a diagram showing a configuration example of the electronic equipment 10A. As shown in FIG. 4, the electronic equipment 10A includes a processing device 110, a communication device 120, a display device 130, an input device 140, and a storage device 150. The processing device 110 includes a processor such as a CPU (Central Processing Unit), that is, a computer. The processing device 110 may be configured by a single processor or may be configured by a plurality of processors. The processing device 110 operates according to the program PRA stored in the storage device 150 to thereby function as a control center of the electronic equipment 10A.

The communication device 120 is a wireless communication circuit that communicates with the wireless relay device 40 by radio. The communication device 120 transmits image data given from the processing device 110 to the wireless relay device 40. The display device 130 displays an image represented by the image data given from the processing device 110. The display device 130 in this embodiment is a liquid crystal display device. The input device 140 includes a plurality of operation pieces that receive various kinds of input operation of the user. Specific examples of the plurality of operation pieces include buttons, switches, a tenkey pad, and cursor keys. The input device 140 outputs, to the processing device 110, data indicating content of operation of the user on the plurality of operation pieces. Consequently, the operation content of the user is transmitted to the processing device 110.

The storage device 150 is a recording medium readable by the processing device 110. The storage device 150 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

In the nonvolatile memory of the storage device 150, the program PRA and the application execution environment VM explained above, a kernel program for implementing the OS of the electronic equipment 10A, various nonnative applications other than the program PRA, and various native applications are stored in advance. In FIG. 4, illustration of the kernel program, the nonnative applications other than the program PRA, and the native applications is omitted. The volatile memory of the storage device 150 is used by the processing device 110 as a work area in executing these programs.

The processing device 110 reads out the kernel program from the nonvolatile memory to the volatile memory at the opportunity when the electronic equipment 10A has been turned on and executes the read-out kernel program. Note that, in FIG. 4, illustration of a power supply of the electronic equipment 10A is omitted. In the electronic equipment 10A, the OS is implemented by causing the processing device 110 to execute the kernel program. In the electronic equipment 10A in a state in which the OS is implemented, a program instructed to be executed by operation on the input device 140 is read out from the nonvolatile memory to the volatile memory and the read-out program is executed. For example, when execution of any native application is instructed, the processing device 110 reads out the relevant native application from the nonvolatile memory to the volatile memory and executes the read-out native application. When execution of the program PRA is instructed, the processing device 110 executes the application execution environment VM first and executes the program PRA using the application execution environment VM.

The processing device 110 executing the program PRA functions as a capturer 110*a*, a transmitter 110*b*, and a drawer 110*c* shown in FIG. 4. That is, all of the capturer 110*a*, the transmitter 110*b*, and the drawer 110*c* shown in FIG. 4 are software modules implemented by causing the computer such as the CPU to operate according to software. Functions of the capturer 110*a*, the transmitter 110*b*, and the drawer 110*c* are as explained below.

The capturer 110*a* captures, according to the program PRA executed in the application execution environment VM, the image GC including the image GA to be displayed on the nonnative layer. The image GA on the menu screen is an example of the content image in the present disclosure. In this embodiment, the image GC captured by the capturer 110*a* is a mirroring target that is, a target image. The target image is an example of the first image in the present disclosure. The capturer 110*a* captures the target image at the opportunity when update of the nonnative layer has been detected by the application execution environment VM. The capturer 110*a* causes the storage device 150 to store image data representing the captured image. The image captured by the capturer 110*a* is an example of the capture image in the present disclosure. In the following explanation, the image data representing the image captured by the capturer 110*a* is referred to as capture image data.

Every time the capturer 110*a* captures the target image, the transmitter 110*b* transmits the capture image data to the projector 30 through the wireless relay device 40 using the communication device 120. Consequently, mirroring of the image being displayed on the display device 130 is implemented.

Figure 5:
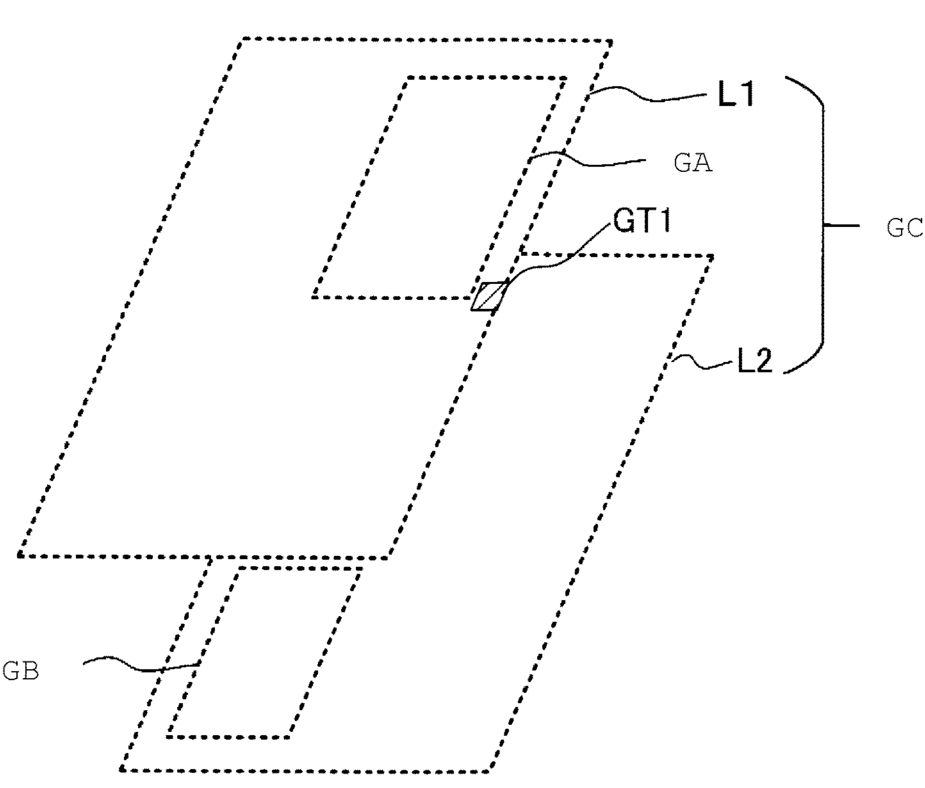
FIG. 5 is a diagram for explaining processing executed by a drawer of the electronic equipment.

FIG. 5 is a diagram for explaining processing executed by the drawer 110*c*. The drawer 110*c* repeatedly draws an image GT1 different from a content image on the layer L1, that is, the nonnative layer at a predetermined period in a period in which the capture image data is transmitted by the transmitter 110*b*. The period in which the capture image data is transmitted by the transmitter 110*b* means a period in which mirroring is executed. The nonnative layer explained above is an example of the first layer in the present disclosure. The image GT1 drawn on the first layer by the drawer 110*c* is an example of the second image in the present disclosure.

As explained above, the program PRA is originally the program developed for the OS of the electronic equipment 20. In the OS of the electronic equipment 20, as a mechanism for drawing an image of an object, a first mechanism in which a transparent color object can be drawn but processing speed is low and a second mechanism in which a transparent color object cannot be drawn but processing speed is high are prepared in advance. For example, if the OS of the electronic equipment 20 is Android, the first mechanism is View and the second mechanism is SurfaceView. Note that Android is a registered trademark.

The drawer 110*c* in this embodiment draws the image GT1 by repeatedly drawing a transparent color on one pixel located at the center right end of the nonnative layer using the first mechanism explained above. Usually, a color is expressed by a combination of transmittance (α), a red component value (R), a green component value (G), and a blue component value (B). Each of α, R, G, and B is a value within a range of 0 to 255. The transparent color in this embodiment is a color, α of which is set to 1/255. For example, a red transparent color is represented as (α, R, G B)=(1, 255, 0, 0). Even if the color, α of which is set to 1/255, is drawn on one pixel, it is almost impossible to identify the color with the naked eye. By drawing the transparent color on the one pixel located at the center right end of the nonnative layer, it is possible to cause update of the nonnative layer substantially invisible to the eyes of the user. In this embodiment, the drawer 110*c* repeatedly draws the red transparent color on the one pixel located at the center right end of the nonnative layer. However, the drawer 110*c* may repeatedly draw a blue transparent color. The drawer 110*c* may alternately draw the red transparent color and the blue transparent color on the one pixel located at the center right end of the nonnative layer. Ergonomically, the human eyes easily identify green. Therefore, if blue and red are drawn, it is considered to be more difficult to identify blue and red.

In FIG. 5, a pixel on which a transparent color is repeatedly drawn in order to draw the image GT1 is indicated by hatching. A reason for drawing the transparent color on the one pixel at the center right end in the nonnative layer is as explained below. In general, buttons for window operation such as a button for closing a window are often arranged at the upper left corner and the upper right corner of a UI (User Interface) screen. Start menu icons are often arranged at the lower left corner of the UI screen. Icons such as a timepiece are often arranged at the lower right corner of the UI screen. Therefore, the user eyes are considered to be easily directed to the four corners of the UI screen. On a UI screen adapted to Japanese, items configuring the screen are often arranged in a direction from the left to the right. Therefore, the user eyes are considered to be less easily directed to the center right end of the screen. The transparent color is drawn on the one pixel at the center right end in the nonnative layer in order to make the image GT1 less conspicuous.

In this embodiment, since the image GT1 is repeatedly drawn on the nonnative layer, even if update of a layer other than the nonnative layer, that is, update of an image of the native application is not detected in the application execution environment VM because of specifications or a bug, a target image is captured every time the image GT1 is drawn. Therefore, if a period for executing the drawing of the image GT1 is set sufficiently short, a problem does not occur in mirroring of the target image.

Figure 6:
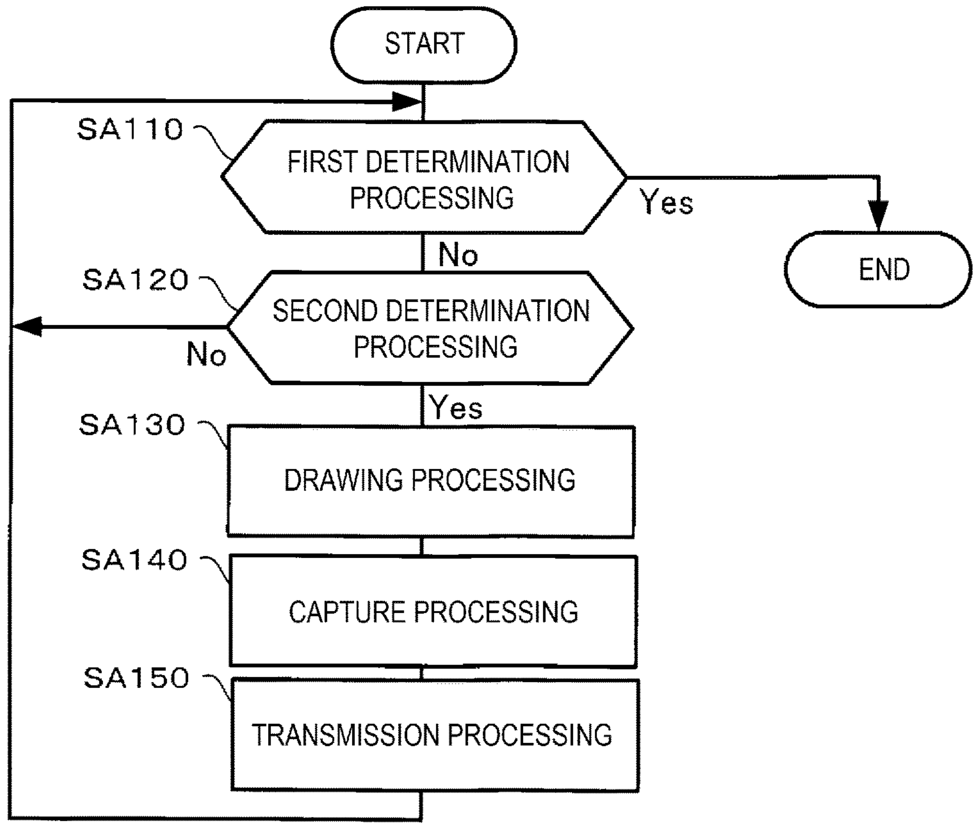
FIG. 6 is a flowchart showing a flow of processing in a mirroring method executed by a processing device of the electronic equipment according to a program.

The processing device 110 operating according to the program PRA executes a mirroring method markedly indicating characteristics of the present disclosure. FIG. 6 is a flowchart showing a flow of processing in the mirroring method. As shown in FIG. 6, the mirroring method includes first determination processing SA110, second determination processing SA120, drawing processing SA130, capture processing SA140, and transmission processing SA150. Processing contents of the first determination processing SA110, the second determination processing SA120, the drawing processing SA130, the capture processing SA140, and the transmission processing SA150 are as explained below.

In the first determination processing SA110, the processing device 110 determines whether an end of mirroring has been instructed by operation on the input device 140. When data given to the processing device 110 from the input device 140 indicates pressing of an operation piece for instructing an end of mirroring, a determination result of the first determination processing SA110 is "Yes". When the data indicates pressing of an operation piece other than the operation piece for instructing an end of mirroring, the determination result of the first determination processing SA110 is "No". When the determination result of the first determination processing SA110 is "Yes", the processing device 110 ends the execution of the mirroring method. A period from when the execution of the program PRA was started until when the determination result of the first determination processing SA110 becomes "Yes" is a period in which mirroring is executed. When the determination result of the first determination processing SA110 is "No", the processing device 110 executes the second determination processing SA120.

In the second determination processing SA120, the processing device 110 determines whether a time corresponding to the predetermined period has elapsed from the last drawing of the image GT1. When the second determination processing SA120 is executed for the first time after the execution start of the program PRA or when the time corresponding to the predetermined period has elapsed from the last drawing of the image GT1, a determination result of the second determination processing SA120 is "Yes". In the second determination processing SA120 executed for the second and subsequent times after the execution start of the program PRA, the determination result is "No" when the time corresponding to the predetermined period has not elapsed from the last drawing of the image GT1. When the determination result of the second determination processing SA120 is "No", the processing device 110 executes the first determination processing SA110 again. When the determination result of the second determination processing SA120 is "Yes", the processing device 110 executes the drawing processing SA130 and the subsequent processing.

In the drawing processing SA130, the processing device 110 functions as the drawer 110*c*. In the drawing processing SA130, the processing device 110 draws the image GT1 explained above on the nonnative layer.

In the capture processing SA140 following the drawing processing SA130, the processing device 110 functions as the capturer 110*a*. In the capture processing SA140, the processing device 110 captures a target image at the opportunity when update of the nonnative layer has been detected by the application execution environment VM. In the capture processing SA140, the processing device 110 causes the storage device 150 to store capture image data.

In the transmission processing SA150 following the capture processing SA140, the processing device 110 functions as the transmitter 110*b*. In the transmission processing SA150, the processing device 110 transmits the capture image data stored in the storage device 150 in the capture processing SA140 to the projector 30 using the communication device 120. When completing the execution of the transmission processing SA150, the processing device 110 executes the first determination processing SA110 and the subsequent processing again.

As explained above, according to this embodiment, even if update of a layer other than the nonnative layer is not detected in the application execution environment VM because of specifications or a bug, a problem does not occur in mirroring of the target image.

B: Second Embodiment

Figure 7:
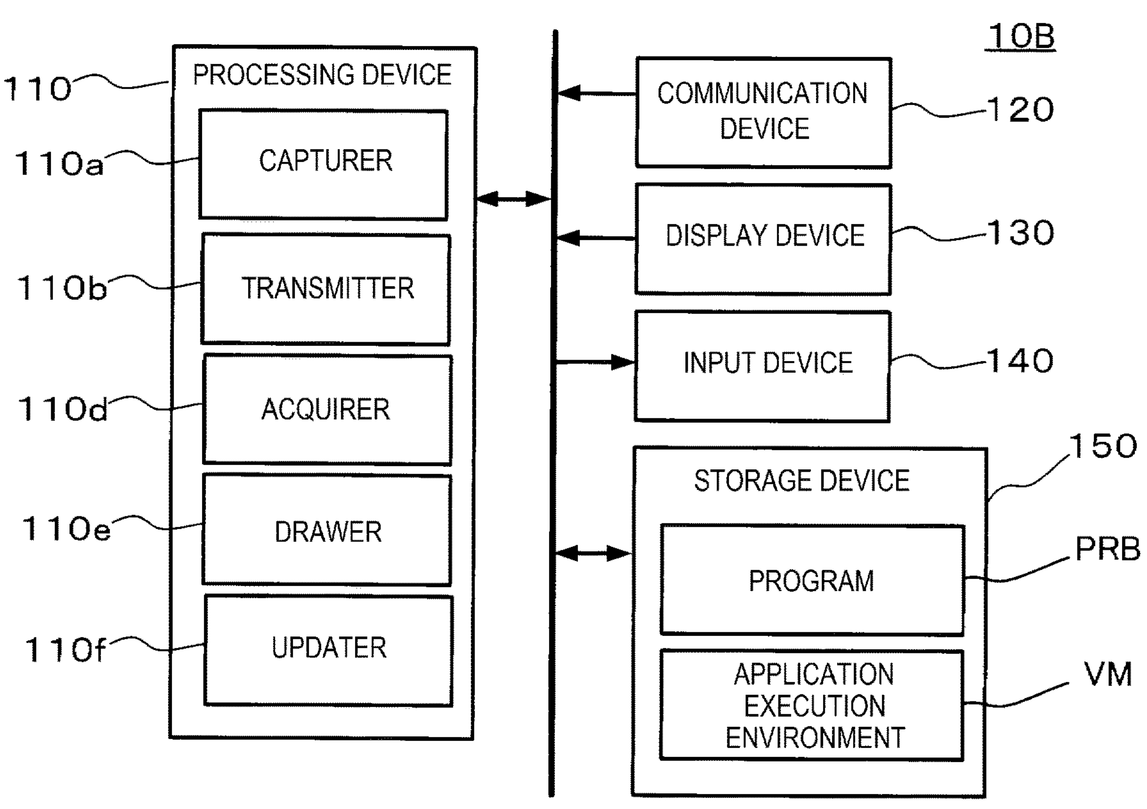
FIG. 7 is a diagram showing a configuration example of electronic equipment.

FIG. 7 is a diagram showing a configuration example of electronic equipment 10B according to a second embodiment of the present disclosure. The electronic equipment 10B is a tablet terminal like the electronic equipment 10A. In FIG. 7, the same components as the components shown in FIG. 4 are denoted by the same reference numerals and signs. As it is evident if FIG. 7 and FIG. 4 are compared, a configuration of the electronic equipment 10B is different from the configuration of the electronic equipment 10A in that a program PRB is stored in the storage device 150 instead of the program PRA. In the following explanation, components common to the first embodiment are denoted by the same reference numerals and signs and detailed explanation of the components is omitted.

The program PRB is a program developed for the OS of the electronic equipment 20 like the program PRA. The program PRB is a program for implementing mirroring like the program PRA. In this embodiment, an OS of the electronic equipment 10B is the same as the OS of the electronic equipment 10A. The application execution environment VM explained above is necessary to execute the program PRB in the electronic equipment 10B. As shown in FIG. 7, the electronic equipment 10B has the application execution environment VM.

The processing device 110 of the electronic equipment 10B executes the program PRB to thereby function as the capturer 110*a*, the transmitter 110*b*, an acquirer 110*d*, a drawer 110*e*, and an updater 110*f* shown in FIG. 7. That is, all of the capturer 110*a*, the transmitter 110*b*, the acquirer 110*d*, the drawer 110*e*, and the updater 110*f* shown in FIG. 7 are software modules implemented by causing a computer such as a CPU to operate according to software. Functions of the acquirer 110*d*, the drawer 110*e*, and the updater 110*f*, which are differences from the first embodiment, are as explained below.

Figure 8:
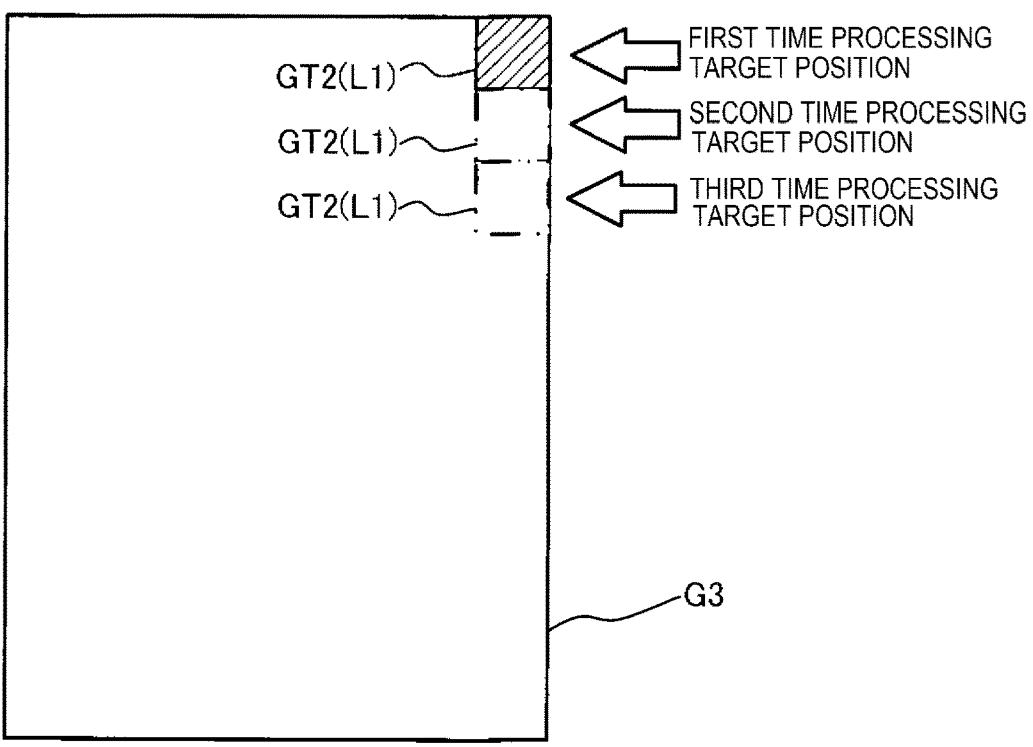
FIG. 8 is a diagram for explaining processing executed by an updater of the electronic equipment.

The acquirer 110*d* acquires a color of a pixel in a processing target position in a target image. In this embodiment, the position at the upper right corner of the target image is predetermined as an initial value of the processing target position. The processing target position is sequentially updated by the updater 110*f* every time a time corresponding to a period of drawing by the drawer 110*e* elapses. FIG. 8 is a diagram for explaining processing executed by the updater 110*f*. As shown in FIG. 8, the updater 110*f* sequentially updates the processing target position to a position lower by one pixel every time the time corresponding to the period of drawing by the drawer 110*e* elapses. Note that, when the processing target position reaches the position at the lower right corner, the updater 110*f* returns the processing target position to the position at the upper right corner. Since the processing target position is sequentially updated in this way, a first portion indicated by the processing target position at first time in a period in which mirroring is executed and a second portion indicated by the processing target position at second time different from the first time in the period are different.

In the period in which the mirroring is executed, the drawer 110_e_ repeatedly draws an image GT2 different from a content image on the layer L1, that is, a nonnative layer at a predetermined period. The drawer 110_e_ draws the image GT2 on the nonnative layer using the second mechanism explained above. As shown in FIG. 8, the drawer 110_e_ draws the image GT2 by drawing, in the processing target position in the nonnative layer, an image of a color obtained by α-blending blue in a color obtained by the acquirer 110_d_ at a ratio of 1/255. The blue is α-blended to, since blue is a color ergonomically having the lowest color identification sensitivity among the three colors of red, green, and blue, make a user less easily feel a change in the color after the α-blending. The image GT2 is an example of the second image in the present disclosure.

As explained above, the second mechanism cannot treat the transparent color. When a predetermined color such as white or black is drawn in the processing target position, a deficiency occurs in that the image GT2 is conspicuous when the difference between the color and a color of the processing target position in the target image is large. In this embodiment, since the color corresponding to the color of the processing target position in the target image is drawn in the processing target position in the nonnative layer, occurrence of the deficiency is avoided.

In this embodiment, since the drawer 110_e_ draws the image GT2, that is, the second image using the second mechanism, drawing speed of the second image is improved compared with the first embodiment. A reason for updating the processing target position by one pixel at a time is as explained below. If the processing target position is fixed, a color acquired by the acquirer 110_d_ is nothing but a color of a pixel drawn last time by the drawer 110_e_ and is not an original color in the processing target image. Therefore, if the acquisition of a color by the acquirer 110_d_ and the drawing by the drawer 110_e_ are repeated, when an image arranged in the processing target position in the nonnative layer has changed, a deficiency occurs in that the image GT2 is conspicuous because the image GT2 cannot follow a color in the image after the change. In order to avoid the occurrence of such a deficiency, it is also conceivable to prepare a first processing target position and a second processing target position in advance and alternately switch the processing target positions every time the acquisition of a color by the acquirer 110_d_ and the drawing by the drawer 110_e_ are performed. However, in some case, threads of capture and drawing are different and, depending on timing, the deficiency cannot be avoided by switching the first processing target position and the second processing target position. Therefore, the updater 110_f_ in this embodiment continuously updates the processing target position by one pixel at a time.

The processing device 110 operating according to the program PRB executes a mirroring method markedly indicating characteristics of the present disclosure. FIG. 9 is a flowchart showing a flow of processing in the mirroring method. As shown in FIG. 9, the mirroring method is different from the mirroring method in the first embodiment in that the mirroring method includes acquisition processing SB110, drawing processing SB120, and update processing SB130 instead of the drawing processing SA130.

In the acquisition processing SB110, the processing device 110 functions as the acquirer 110_d_. In the acquisition processing SB110, the processing device 110 acquires a color of a pixel of the processing target position in the processing target image. In the drawing processing SB120, the processing device 110 functions as the drawer 110_e_. In the drawing processing SB120, the processing device 110 draws, in the processing target position in the nonnative layer, an image of a color obtained by α-blending blue in a color obtained by the acquirer 110_d_ at a ratio of 1/255. In the update processing SB130, the processing device 110 functions as the updater 110_f_ and updates the processing target position to a position lower by one pixel.

As explained above, according to this embodiment, as in the first embodiment, even if update of a layer other than the nonnative layer is not detected in the application execution environment VM because of specifications or a bug, a problem does not occur in mirroring of the target image. According to this embodiment, since drawing speed of the second image is improved compared with the first embodiment, even if a content image requiring high-speed drawing such as an image of a game is included in the target image, it is possible to perform mirroring of the target image without a problem.

C: Modifications

The first embodiment and the second embodiment are explained above. These embodiments may be modified as explained below.

C-1: Modification 1

In the embodiments, the projector 30 is the external device. However, a storage device that stores image data transmitted from the electronic equipment 10A or the electronic equipment 10B may be the external device. An FPD (Flat Panel Display) may be the external device.

C-2: Modification 2

The number of pixels on which the drawer 110_c_ draws the transparent color is not limited to one and may be two or more. The position where the drawer 110_c_ draws the transparent color is not limited to the center right end of the nonnative layer. The position where the drawer 110_c_ draws the transparent color only has to be a position different from the position where the icons or the buttons for window operation are displayed. In short, the drawer 110_c_ only has to draw the transparent color in at least a part of the nonnative layer. Note that, in the electronic equipment 10A for a language in which characters are written from the right to the left, since the eyes of the user are considered to be less easily directed to the center left end in an image, the drawer 110_c_ may draw the transparent color on a pixel at the center left end. Therefore, the position of a pixel on which the transparent color is repeatedly drawn may be set according to a language to which the electronic equipment 10A is adapted.

When a pure white or pitch black image is arranged on the native layer, the drawer 110_c_ may draw, on one pixel of the nonnative layer, a slightly pale gray or a slightly darker gray than the pale gray instead of the transparent color. Specific examples of the pale gray include a color with (α, R, G, B)=(1, 1, 1, 1). Specific examples of the slightly darker gray than the pale gray include a color with (α, R, G, B)=(2, 1, 1, 1). This is because, when the image arranged on the native layer is the pure white or pitch black image, the second image is considered to be less conspicuous when a color drawn on one pixel of the nonnative layer is the pale gray or the slightly darker gray than the pale gray rather than the red transparent color. As the second image, an image of a predetermined color other than the transparent color such as red, blue, black, or white may be used. According to this form, it is possible to make the second image conspicuous and clearly indicate to the user that mirroring is being executed. By using, as the second image, an image indicating that the mirroring is executed such as an image representing words such as "mirroring is being executed", it may be clearly indicated to the user that the mirroring is being executed.

C-3: Modification 3

All of the capturer 110$a$, the transmitter 110$b$, and the drawer 110$c$ in the first embodiment are the software modules. However, any one, any two, or all of the capturer 110$a$, the transmitter 110$b$, and the drawer 110$c$ may be hardware modules configured by electronic circuits or the like. Even if any one, any two, or all of the capturer 110$a$, the transmitter 110$b$, and the drawer 110$c$ are the hardware modules, the same effects as the effects in the first embodiment are achieved. Similarly, the acquirer 110$d$, the drawer 110$e$, and the updater 110$f$ in the second embodiment may also be hardware modules. Even if any one, any two, or all of the acquirer 110$d$, the drawer 110$e$, and the updater 110$f$ in the second embodiment are the hardware modules, the same effects as the effects in the second embodiment are achieved.

C-4: Modification 4

The program PRA may be manufactured alone or may be provided for a fee or free of charge. Examples of a specific provision form of the program PRA include a form in which the program PRA is distributed by being written in a computer-readable recording medium such as a flash ROM and a form in which the program PRA is distributed by download through an electric communication line such as the Internet. Similarly, the program PRB may be manufactured alone or may be provided for a fee or free of charge.

D: Summary of the Present Disclosure

The present disclosure is not limited to the embodiments and the modifications explained above and can be realized in various aspects without departing from the gist of the present disclosure. For example, the present disclosure can also be realized by aspects described below. Technical features in the embodiments corresponding to technical features in the aspects described below can be substituted and combined as appropriate in order to solve a part or all of the problems of the present disclosure or achieve a part or all of the effects of the present disclosure. Unless the technical features are explained as essential technical features in this specification, the technical features can be deleted as appropriate.

A summary of the present disclosure is noted below.

Note 1

A non-transitory computer-readable storage medium storing a program, the program causing a processing device in electronic equipment, which includes a display device and the processing device that displays an image on the display device, to execute: capturing a first image including a content image displayed, according to an application program executed in an application execution environment, on a first layer of the image displayed on the display device; transmitting a capture image acquired by the capturing to an external device; and repeatedly drawing, on the first layer, a second image different from the content image in a period in which the transmitting is executed.

With the non-transitory computer-readable storage medium storing the program described in Note 1, since the second image is repeatedly drawn on the first layer, even if update of a layer other than the first layer is not detected in the application execution environment because of specifications or a bug, the first image is captured every time the second image is drawn. Therefore, with the non-transitory computer-readable storage medium storing the program described in Note 1, even if update of a layer other than the first layer is not detected in the application execution environment because of specifications or a bug, a problem does not occur in mirroring of the first image with the external device.

Note 2

The non-transitory computer-readable storage medium storing the program described in Note 1, wherein the repeatedly drawing the second image may be repeatedly drawing a transparent color on at least a part of pixels of the first layer.

With the non-transitory computer-readable storage medium storing the program described in Note 2, it is possible to make the second image less conspicuous when viewed from the eyes of a user.

Note 3

The non-transitory computer-readable storage medium storing the program described in Note 1, wherein the repeatedly drawing the second image may include: acquiring a color of a first portion of the first image captured at first time in the period; drawing a color corresponding to the color of the first portion on a pixel corresponding to the first portion of the first layer; acquiring a color of a second portion different from the first portion of the first image captured at second time in the period different from the first time; and drawing a color corresponding to the color of the second portion on a pixel corresponding to the second portion of the first layer.

With the non-transitory computer-readable storage medium storing the program described in Note 3, even if the first image changes with time, it is possible to make the second image less conspicuous when viewed from the eyes of the user.

Note 4

The non-transitory computer-readable storage medium storing the program described in any one of Note 1 to Note 3, wherein the repeatedly drawing the second image may include drawing the second image in a position different from a position where icons or buttons for window operation are displayed in the first layer.

With the non-transitory computer-readable storage medium storing the program described in Note 4, it is possible to make the second image less conspicuous when viewed from the eyes of the user.

Note 5

The non-transitory computer-readable storage medium storing the program described in any one of Note 1 to Note 4, wherein the second image may include an image of a predetermined color.

With the non-transitory computer-readable storage medium storing the program described in Note 5, it is possible to perform mirroring of the first image with the external device without a problem while, by intentionally making the second image conspicuous, clearly indicating to the user that the mirroring is performed.

Note 6

The non-transitory computer-readable storage medium storing the program described in any one of Note 1 to Note 5, wherein the second image may include an image indicating that the transmitting is executed.

With the non-transitory computer-readable storage medium storing the program described in Note 6, it is possible to perform mirroring of the first image with the external device without a problem while clearly indicating to the user that the mirroring is performed.

Note 7

A mirroring method according to an aspect of the present disclosure is a mirroring method for an image displayed on a display device in electronic equipment including the display device and a processing device that displays the image on the display device, the mirroring method including: capturing a first image including a content image displayed, according to an application program executed in an application execution environment, on a first layer of the image displayed on the display device; transmitting a capture image acquired by the capturing to an external device; and repeatedly drawing, on the first layer, a second image different from the content image in a period in which the transmitting is executed.

With the mirroring method described in Note 7, as in the non-transitory computer-readable storage medium storing the program described in Note 1, even if update of a layer other than the first layer is not detected in the application execution environment because of specifications or a bug, a problem does not occur in mirroring of the first image with the external device.

Note 8

An electronic equipment according to an aspect of the present disclosure including: a display device; and a processing device that displays an image on the display device, the processing device executing: capturing a first image including a content image displayed, according to an application program executed in an application execution environment, on a first layer of the image displayed on the display device; transmitting a capture image acquired by the capturing to an external device; and repeatedly drawing, on the first layer, a second image different from the content image in a period in which the transmitting is executed.

With the electronic equipment described in Note 8, as in the non-transitory computer-readable storage medium storing the program described in Note 1 or the mirroring method in Note 7, even if update of a layer other than the first layer is not detected in the application execution environment because of specifications or a bug, a problem does not occur in mirroring of the first image with the external device.

What is claimed is:

1. A non-transitory computer-readable storage medium storing a program, the program causing a processing device in electronic equipment, which includes a display device and the processing device that displays an image on the display device, to execute:

capturing a first image including a content image displayed, according to an application program executed in an application execution environment, on a first layer of the image displayed on the display device;

transmitting a capture image acquired by the capturing to an external device; and repeatedly drawing on the first layer, a second image different from the content image in a period in which the transmitting is executed, wherein the repeatedly drawing the second image includes:

acquiring a color of a first portion of the first image captured at first time in the period;

drawing a color corresponding to the color of the first portion on a pixel corresponding to the first portion of the first layer;

acquiring a color of a second portion different from the first portion of the first image captured at second time different from the first time in the period; and drawing a color corresponding to the color of the second portion on a pixel corresponding to the second portion of the first layer.

2. The non-transitory computer-readable storage medium storing the program according to claim 1, wherein the repeatedly drawing the second image includes repeatedly drawing a transparent color on at least a part of pixels of the first layer.

3. The non-transitory computer-readable storage medium storing the program according to claim 1, wherein the repeatedly drawing the second image includes drawing the second image in a position different from a position where icons or buttons for window operation are displayed in the first layer.

4. The non-transitory computer-readable storage medium storing the program according to claim 1, wherein the second image includes an image of a predetermined color.

5. The non-transitory computer-readable storage medium storing the program according to claim 1, wherein the second image includes an image indicating that the transmitting is executed.

6. An electronic equipment comprising:

a display device; and a processing device that displays an image on the display device, the processing device executing:

capturing a first image including a content image displayed, according to an application program executed in an application execution environment, on a first layer of the image displayed on the display device;

transmitting a capture image acquired by the capturing to an external device; and repeatedly drawing on the first layer, a second image different from the content image in a period in which the transmitting is executed, wherein the repeatedly drawing the second image includes:

acquiring a color of a first portion of the first image captured at first time in the period;

drawing a color corresponding to the color of the first portion on a pixel corresponding to the first portion of the first layer;

acquiring a color of a second portion different from the first portion of the first image captured at second time different from the first time in the period; and drawing a color corresponding to the color of the second portion on a pixel corresponding to the second portion of the first layer.

* * * * *